April 20, 1937. C. ZORZI 2,078,114

CONSTRUCTION OF ELECTRIC SINGLE-PHASE MOTORS

Filed Nov. 30, 1932

Inventor
Carlo Zorzi,
by
Harold S. Luggin
Attorney

Patented Apr. 20, 1937

2,078,114

UNITED STATES PATENT OFFICE 2,078,114

CONSTRUCTION OF ELECTRIC SINGLE-PHASE MOTORS

Carlo Zorzi, New York, N. Y.

Application November 30, 1932, Serial No. 645,031.
In Italy November 30, 1931

2 Claims. (Cl. 172—233)

This invention has as its aim the construction of an electric motor which, though singlephase, has such characteristics that it may be compared to triphase induction motors on account of the ease with which it starts, the absorption of current at starting and above all on account of its simplicity.

The present type of motor can be used not only in domestic applications, but in all automatic installations and particularly in cases where it is impossible to give the installation the care and attention needed.

Monophase motors known at the present time may be divided into the following wide groups:
(1) Commutator motors (repulsion motors or motors derived from the brushes).

(2) Splitphase induction motors (having an auxiliary de-phased circuit which is inserted during the starting or always inserted).
(3) Mixed types: respulsion-induction.

The first group of motors are especially used in small machines and where it is required to have an intermittent working with powerful torque, the type noted under No. 3, are more greatly used where an orderly and exact working is required without an excessive starting current. Both types have a commutator and brushes. In the No. 3 type, there are also devices which, after starting is accomplished, the circuits are closed and the brushes lifted so that the motor functions by induction.

The present invention overcomes these difficulties by providing a motor with condenser winding always inserted, whereby de-phasing is accomplished at the moment of starting with a considerable angle between the currents of the direct circuit and the currents of the condenser circuit and at the same time keeping during operation, a working function having a considerable angle and re-phasing function.

Figure 1:
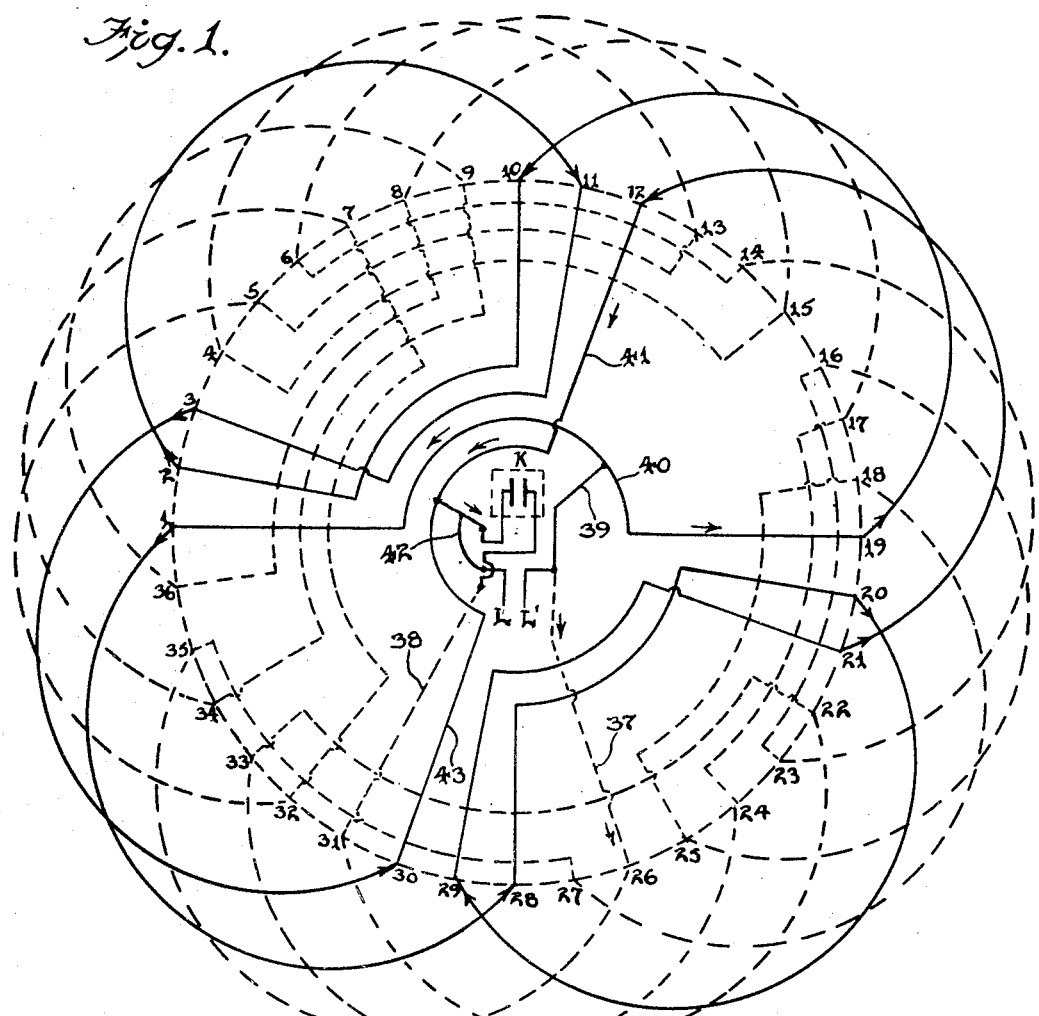
Figure 2:
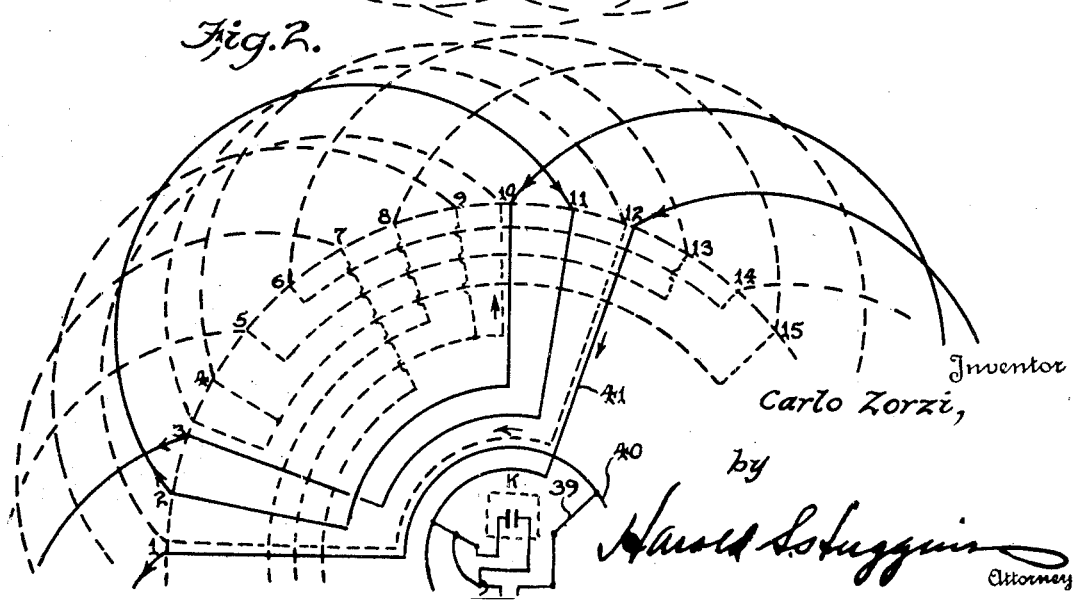

Fig. 1 represents a diagrammatic view illustrating the windings of the stator of a single phase four pole motor, and, Fig. 2 represents a portion of diagrammatic view illustrating the windings of the stator of a single phase four pole motor with some of the slots having coils of both circuits in the same.

In the drawing, L and L' indicate the line circuit. The heavy lines, represented through 1—2—3; 10—11—12; 19—20—21 and 28—29—30, indicate the windings connected directly to the line, while the dotted lines, 4—5—6—7—8—9; 13—14—15—16—17—18; 22—23—24—25—26—27 and 31—32—33—34—35—36 indicate the windings connected through the capacity K. The heavy lines constitute one-third of the total windings and the dotted lines constitute two-thirds of the total windings.

The supply wire L' is connected directly by conductor 39 to conductor 40 where the current divides, part flowing in succession to coils 1—28—20—29—21—12 and thence back by conductor 41 to conductor 42 which is connected to supply wire L, the other portion of the current flowing from supply L' to conductors 39 and 40 through coils 19—10—2—11—3—30 and by conductor 43 to conductor 42 and thence to supply wire L.

The coils in the capacity circuit, being in series, the current flows through supply wire L' to coils 26—35—27—18—25—16—23—14—6—15—4—13—5—32—7—34—9—36—8—17—24—33—22—31 to conductor 38 through K and thence to supply wire L, while current flows through supply wire L to conductor 42, through capacity K, conductor 38 to coils 31—22—33—24—17—8—26—9—34—7—32—5—13—4—15—6—14—23—16—25—18—27—35—26 to conductor 37, thence to supply wire L'.

The respective action of the two circuits has here been presented and the aim set has been reached by enlarging the circuit of the condensers up to the point where such circuit itself occupies two-thirds of the statoric ring leaving the other third to the direct connected circuit, thereby properly allotting the capacity.

Up to today the auxiliary circuit has always occupied a small portion of the statoric ring usually a third, while the principal circuit occupied the other two thirds; for example, if the stator carried 36 slots uniformly distributed and of equal size, 24 would be allotted to the direct circuit and 12 to the auxiliary circuit, and this in the condenser type as well as in the resistance type.

Instead, in the present invention, it is to be noted that the directly connected circuit coil equal one-third of the total windings and are arranged equidistantly around the stator, while the capacity or condenser circuit constitutes two thirds of the total windings and are proportionably equidistanced around the stator and the coils of the directly connected circuit. As illustrated in the drawing, the directly connected circuit coils are equally spaced in groups of three between which are equally proportioned in group of six, the coils of the capacity or condenser circuit. Under this arrangement I have constructed a singlephase motor comparing in size to that of one-third horse power yet having an efficiency of more than 60% with a power factor superior to 0.9 and with a starting current less than twice the working current with torques up to the unit.

In cases where a special powerful starting torque is required and for balancing the works of the two circuits, especially in starting, one mutual induction current is provided between the directly connected circuit and the capacitor or condenser circuit. This effect can be had by having the two circuit coils running in the same slot. By referring to Fig. 2, it will be seen that the circuits are substantially the same as in Fig. 1 with the added feature of combining, in some of the slots, both the coil of the directly connected circuit and the coil of the capacity circuit whereby the two circuits can be magnetically connected together so that the windings of the two circuits are within the same slots.

In Fig. 2, it will be seen that both the capacity coil and directly connected coil are located in slots 1, 3, 10 and 12 as represented by the heavy line for the directly connected circuit and the dotted line for the capacity circuit. By such an arrangement, a perfect balance for the two circuits is accomplished, thereby providing a greater torque for the motor when starting and eliminating the possibility of one circuit becoming overloaded.

What I claim as my invention is:

1. In an induction motor, a stator core having a plurality of slots formed therein, a main inductive winding comprised of comparatively few turns of wire disposed in a plurality of groups of said slots, an auxiliary capacitive winding comprised of a large number of turns of wire disposed in the remainder of said slots, and a capacitor associated with said last winding, said groups of slots containing substantially less slots than the number of slots containing the auxiliary winding.

2. In an induction motor, a stator core having a plurality of slots formed therein, a main inductive winding in some of said slots adapted to form narrow and highly saturated poles in said core, an auxiliary winding in others of said slots adapted to form wide and lowly saturated poles in said core between said first fields, and a capacitor associated with said last winding and adapted to dephase poles set up by the auxiliary winding in accordance with the induction in the main winding from starting to running conditions.

CARLO ZOREI.